United States Patent
Liu et al.

(10) Patent No.: US 11,305,665 B2
(45) Date of Patent: Apr. 19, 2022

(54) CYBER-ATTACK DETECTION AND ELECTRICAL SYSTEM STABILITY FOR ELECTRIC VEHICLE CHARGING INFRASTRUCTURE

(71) Applicant: General Electric Company, Schenectady, NY (US)

(72) Inventors: Hanchao Liu, Troy, NY (US); Honggang Monten Wang, Clifton Park, NY (US); Philip Hart, Rexford, NY (US); Yichao Zhang, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 456 days.

(21) Appl. No.: 16/291,342

(22) Filed: Mar. 4, 2019

(65) Prior Publication Data

US 2020/0282854 A1 Sep. 10, 2020

(51) Int. Cl.
 *H02J 7/00* (2006.01)
 *B60L 53/62* (2019.01)
 (Continued)

(52) U.S. Cl.
 CPC .............. *B60L 53/62* (2019.02); *B60L 53/11* (2019.02); *H04L 63/14* (2013.01);
 (Continued)

(58) Field of Classification Search
 CPC ....................................................... B60L 53/62
 (Continued)

(56) References Cited

U.S. PATENT DOCUMENTS 8,259,479 B2 * 9/2012 Wagoner .................. H02J 3/38
  363/97
8,506,990 B2  8/2013 Bernstein
(Continued)

FOREIGN PATENT DOCUMENTS

EP   3657627 A1   5/2020
WO  2011156776 A2  12/2011

OTHER PUBLICATIONS

International Search Report and Written Opinion dated Jun. 16, 2020 which was issued in connection with PCT Application No. PCT/US2020/020667 which was filed on Mar. 2, 2020.

*Primary Examiner* — Yalkew Fantu
(74) *Attorney, Agent, or Firm* — Ziolkowski Patent Solutions Group, SC

(57) ABSTRACT

Some embodiments provide a system to protect an electric vehicle charging infrastructure. An electric vehicle charging site may receive Alternating Current ("AC") power from a power grid and provides Direct Current ("DC") power to electric vehicles. A sensor spoof observer and controller may receive information from at least two AC current sensors, wherein the observer calculates a grid voltage disturbance using a structure based on an AC filter dynamic model. A system stability assurance platform may: (i) monitor current and voltage to detect resonance, (ii) identify impedance associated with a detected resonance, and (iii) apply a result of an analysis of the identified impedance to an adaptive damping control algorithm. A user interface platform may then provide information about a component of the charging infrastructure being cyber-attacked to a distribution system operator via a graphical user interface display.

22 Claims, 16 Drawing Sheets

(51) Int. Cl.
*B60L 53/10* (2019.01)
*H04L 29/06* (2006.01)
*G06F 17/14* (2006.01)

(52) U.S. Cl.
CPC ....... *H04L 63/1441* (2013.01); *B60L 2270/20* (2013.01); *G06F 17/141* (2013.01)

(58) Field of Classification Search
USPC .......................................................... 320/104
See application file for complete search history.

(56) References Cited

U.S. PATENT DOCUMENTS

| | | |
|---|---|---|
| 8,595,831 B2 | 11/2013 | Skare |
| 9,506,990 B2 | 11/2016 | Stewart et al. |
| 9,560,071 B2 | 1/2017 | Ruvio et al. |
| 2011/0313603 A1* | 12/2011 | Laberteaux ............. B60L 53/64 701/22 |
| 2012/0235646 A1 | 9/2012 | Lo et al. |
| 2013/0113413 A1 | 5/2013 | Harty |
| 2016/0320435 A1 | 11/2016 | Budhraja et al. |
| 2016/0344210 A1 | 11/2016 | Zhang |
| 2020/0162487 A1* | 5/2020 | Hong .................. H04L 63/1416 |
| 2020/0233956 A1* | 7/2020 | Wang .................... B60L 53/305 |
| 2020/0242534 A1* | 7/2020 | Klink ............... G06Q 10/06395 |

\* cited by examiner

CYBER-ATTACK DETECTION AND ELECTRICAL SYSTEM STABILITY FOR ELECTRIC VEHICLE CHARGING INFRASTRUCTURE

BACKGROUND

Electric vehicle charging infrastructures that operate physical systems (e.g., associated with electric vehicles and charging stations) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage. Currently, little work is being done to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack). Existing approaches to protect an electric vehicle charging infrastructure, such as failure and diagnostics technologies, may not adequately address these problems—especially when multiple, simultaneous attacks and/faults occur since such multiple faults/failure diagnostic technologies are not designed for detecting stealthy attacks in an automatic manner.

An increase in electric vehicle charging power levels (e.g., up to 350 Kilowatts ("KW") as in Extreme Fast Charging ("XFC")) may poses additional cybersecurity risks for the power grid and the evolving electrified transportation system. Moreover, these risks may be compounded by the accelerated rate of data sharing within the elective vehicle infrastructure and the mobile nature of electric vehicles.

For example, within the IT-layer, malware loaded onto an electric vehicle or Electric Vehicle Supplier Equipment ("EVSE") might propagate to other equipment in the smart grid, leading to severe regional blackouts. In the OT layer, hacked communications between the electric vehicle and the EVSE might overcharge batteries and could cause severe damage to electric vehicles. An intentional physical layer attack, such as rapid cycling of multiple high-power electric vehicle charging station loads, may cause widespread disruption in the power grid. Any single IT, OT, or physical layer protection technique cannot by itself effectively ensure the resiliency of the electric vehicle charging infrastructure in the face of a determined cyberattack. There is a growing need for a holistic end-to-end solution with a "defense-in-depth" architecture consisting of IT, OT, and physical-layer protections.

In electric vehicle charging stations, there are many power electronics converters (including AC-to-DC and DC-to-DC converters) with high power ratings. Once a cyber attacker enters the physical layer, and gains access to the control of these charging station converters, he or she may interfere with the stable operation of the individual converter as well as the overall electrical systems (e.g., from the charging station electrical network to the substation power grid). Sophisticated attacks may intelligently exploit the dynamic control of the converters in a charging station (e.g., a small number of compromised DC-to-DC chargers could be utilized as a tool to systematically disrupt the operation of the rest of the charging station without being revealed). Because of the large power ratings (up to multiple MW), a charging station inverter could be manipulated to impact the distribution grid, including exciting electrical and/or electromechanical resonances that might possibly cause the physical destruction of generators.

There is a need for a cyber protection mechanism to detect cyber-attacks on charging station sensors, actuators, controllers, and commands. There is also a need to provide a resilient response mechanism that helps maintain electrical stability and system availability during a cyber-attack. It would therefore be desirable to protect an electric vehicle charging infrastructure from cyber-attacks in an automatic and accurate manner even when attacks percolate through the IT and OT layers and directly harm control systems.

SUMMARY

Some embodiments described herein provide a general framework to protect an electric vehicle charging infrastructure. An electric vehicle charging site may receive Alternating Current ("AC") power from a power grid and provides Direct Current ("DC") power to electric vehicles. A sensor spoof observer and controller may receive information from at least two AC current sensors, wherein the observer calculates a grid voltage disturbance using a structure based on an AC filter dynamic model. A system stability assurance platform may: (i) monitor current and voltage to detect resonance, (ii) identify impedance associated with a detected resonance, and (iii) apply a result of an analysis of the identified impedance to an adaptive damping control algorithm. A user interface platform may then provide information about a component of the charging infrastructure being cyber-attacked to a distribution system operator via a graphical user interface display.

Some embodiments comprise: means for receiving, at a sensor spoof observer and controller, information from at least two AC current sensors; means for calculating, by the sensor spoof observer and controller, a grid voltage disturbance using a structure based on an AC filter dynamic model; means for monitoring, by a system stability assurance platform, current and voltage to detect resonance; means for identifying, by the system stability assurance platform, impedance associated with a detected resonance; means for applying, by the system stability assurance platform, a result of an analysis of the identified impedance to an adaptive damping control algorithm; and means for providing, by a user interface platform, information about a component of the charging infrastructure being cyber-attacked to a distribution system operator via a graphical user interface display.

Some technical advantages of some embodiments disclosed herein are improved systems and methods to protect an electric vehicle charging infrastructure from cyber-attacks (and, in some cases, faults) in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Some embodiments described herein provide a systematic architecture for an electric vehicle charging station to detect a cyber-attack and help control the stability of the electrical system that is under cyber-attack. Embodiments may include: (1) a converter sensor spoof observer and controller, (2) system stability attack detection and assurance algorithm, and (3) a Human Machine Interface ("HMI"). In particular, embodiments may incorporate a method to detect a spoofed sensor and a controller that maintains converter control stability with the spoofed sensor. Embodiments may also provide a method to detect system resonance due to cyber-attack, including altered control parameters and cycling setpoints, and a method to help damp the system resonance due to such attacks. Some embodiments may also implement an HMI for a distribution system operator and/or a charging network operator. The interface may display relevant information concerning electric vehicle charging stations within the distribution system and alert the operator when a cyber-attack targets one or more charging stations.

Figure 1:
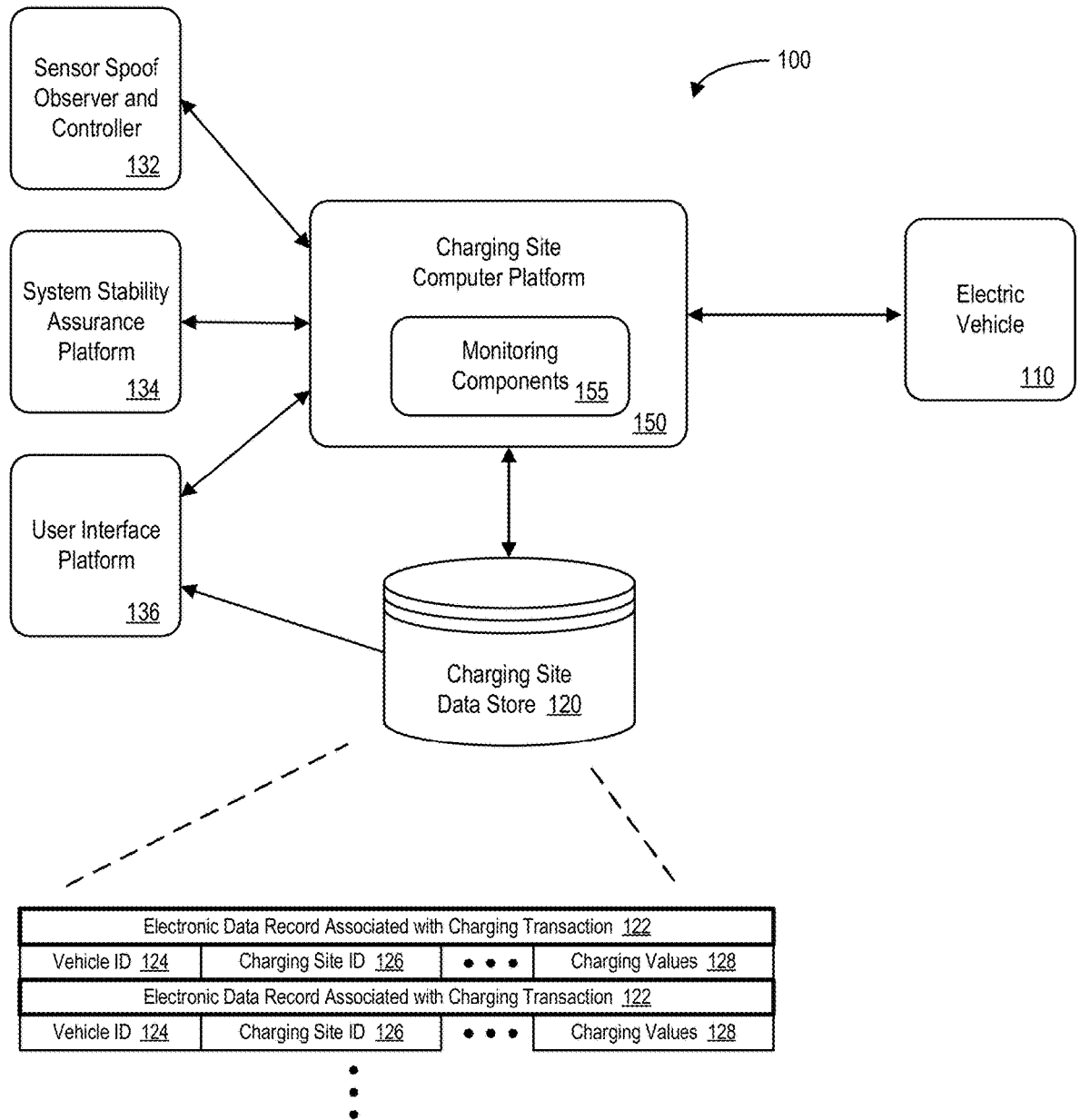
FIG. 1 is a block diagram of a system to protect a charging infrastructure according to some embodiments.

FIG. 1 is a block diagram of an electric vehicle charging infrastructure protection system 100 according to some embodiments. In particular, the system 100 includes a charging site data store 120 (e.g., containing electronic records 122 associated with charging transaction, including a vehicle identifier 124, a charging site identifier 126, charging values 128, etc.) and a charging site computer platform 150 to charge an electric vehicle 110. The charging site computer platform 150 may, according to some embodiments, execute monitoring components 155 associated with a sensor spoof observer and controller 132, a system stability assurance platform 134, and/or a user interface platform 136. The charging site computer platform 150 might be, for example, associated with a Personal Computers ("PC"), laptop computer, an enterprise server, a server farm, and/or a database or similar storage devices.

As used herein, devices, including those associated with the charging site computer platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. According to some embodiments, an "automated" charging site computer platform 150 may protect a charging infrastructure. As used herein, the term "automated" may refer to, for example, actions that can be performed with little or no human intervention.

The charging site computer platform 150 may store information into and/or retrieve information from databases (e.g., the charging site data store 120). The databases might be, for example, locally stored relational database or reside physically remote from the charging site computer platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 100 via remote devices and/or a user interface platform. The operator interface might, for example, let an operator or administrator analyze charging station anomalies, implement remedial responses, etc.

Note that any number of charging site computer platforms 150 might be included in the system 100. Moreover, various devices described herein might be combined according to embodiments of the present invention. For example, in some embodiments, the charging site computer platform 150 and a charging site data store 120 might be co-located and/or may comprise a single apparatus. Moreover, the functions described herein might be implemented in a cloud-based environment and/or by a service provider (e.g., performing services for one or more enterprises, power distributors, or businesses).

Figure 2:
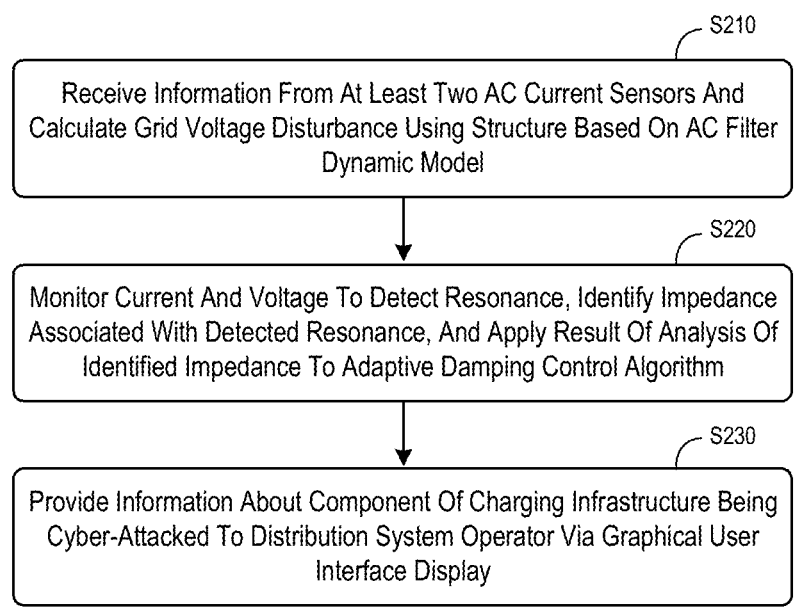
FIG. 2 is a charging infrastructure protection method in accordance with some embodiments.

FIG. 2 illustrates an electric vehicle charging infrastructure protection method that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. Note that some embodiments may be directed to a computerized method to protect an electric vehicle charging infrastructure that receives AC power from a power grid and provides "DC power to electric vehicles. Moreover, any of the embodiments described herein might be associated with extreme fast charging ("XFC").

At S210, a sensor spoof observer and controller may receive information from at least two AC current sensors. The sensor spoof observer and controller may then calculate a grid voltage disturbance using a structure based on an AC filter dynamic model. The sensor spoof observer and controller might, according to some embodiments, utilize information from a second AC current sensor when it is determined that a first AC current sensor is being cyber-attacked. Note that the AC filter dynamic model may be continuously corrected using a difference between a measured output and an observed output to minimize state-variable divergence. According to some embodiments, the grid voltage disturbance might be associated with AC unbalance.

At S220, a system stability assurance platform may monitor current and voltage to detect resonance. The system stability assurance platform may then identify impedance associated with a detected resonance and apply a result of an analysis of the identified impedance to an adaptive damping control algorithm. The system stability assurance platform might detect resonance associated with, for example, altered control parameters and/or cycling setpoints. According to some embodiments, the system stability assurance platform includes an AC system-level stability assurance algorithm and a DC system-level stability assurance algorithm. Moreover, resonance may be detected via a sliding Discrete Fourier Transform ("DFT") and/or a wavelet analysis. Note that the impedance associated with the detected resonance might identified using analytical model predictions and a small-signal injection to improve signal-to-noise ratio.

At S230, a user interface platform may provide information about a component of the charging infrastructure being cyber-attacked to a distribution system operator via a graphical user interface display. The graphical user interface display might include, for example, static information regarding the charging site, a physical location of the charging site, a topology of the charging site, a number of charging ports, indications of occupied charging ports, details regarding a nature of a cyber-attack, an indication regarding resonance, a frequency or magnitude of resonance, a cyber-attack remediation recommendation, etc.

Figure 3:
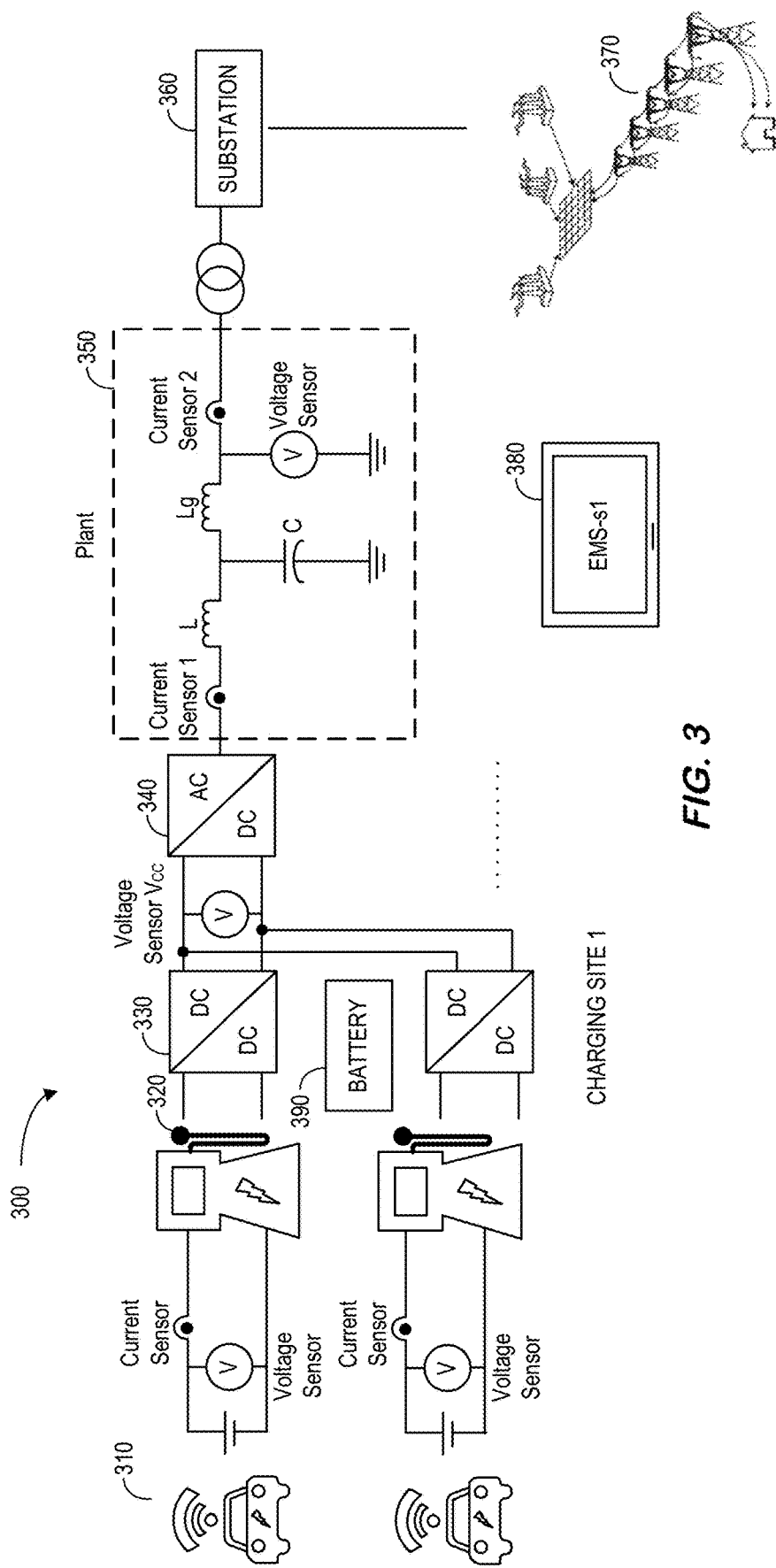
FIG. 3 is high-level architecture of an electric vehicle charging infrastructure cyber-physical system according to some embodiments.

FIG. 3 is high-level architecture 300 of an Electric Vehicle ("EV") 310 or Plug-in EV ("PEV") charging infrastructure cyber-physical system that might include charge pumps 320 according to some embodiments. The EV 310 and charge pumps 320 might exchange, for example, Power Line Communication ("PLC") and/or Pulse Width Modulation ("PWM") information. Note that EVs 310 are expected to become a major component of the power grid 370, and FIG. 3 illustrates a power topology of an XFC charging station site. Since multiple 350 kW access points may be co-located at a single charging station site, large variations in average and peak charging demands may exist throughout the day. For this reason, it may prove desirable to integrate local energy sources such as batteries 390 and solar generation within the charging site. XFCs and energy sources may typically be integrated via low voltage AC distribution. However, as the total capacity of the XFC charging site increases with respect to the AC grid supply, DC distribution may become a much more economic and compact solution. As shown in FIG. 3, an XFC charging site might be coupled to the power grid 370 via a substation 360 and AC-to-DC converter. A DC bus and/or a DC-to-DC converter 330 may then provide power to the charge pumps 320.

An energy storage device, such as the battery 390, may connect to the DC bus to reduce the grid stress, accommodate distributed power generation, and/or reduce cost through demand response. The AC/DC grid-interface inverter 340 may transfer power between the shared DC bus and the AC grid feeder. Together with a transformer and switchgear, the inverter 340 and shared DC bus forms one charging site. Using one or multiple points-of-interconnect, charging sites may interface with the power grid 370 at a location downstream from the distribution substation 360 operated and controlled by a Distribution Substation Energy Management System ("EMS-DS") via a communication network. The EMS-DS 370 may communicate with a Charging Network Operator Controller ("EMS-CO"). The EMS-CO 380 may manage each XFC directly or through an on-site EMS 380 (e.g., "EMS-s1" through EMS-sN).

Figure 4:
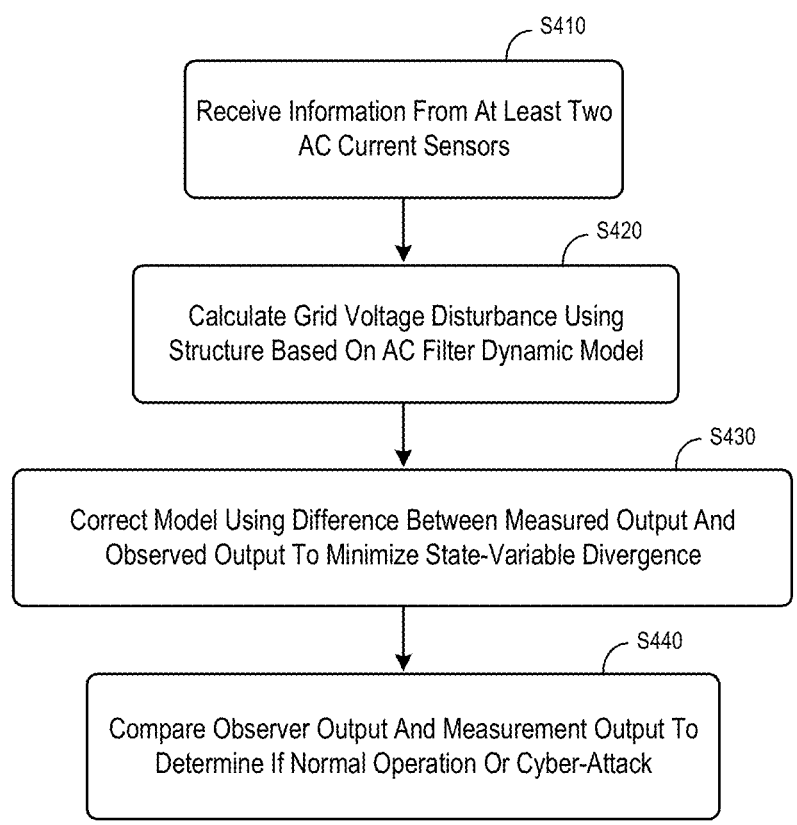
FIG. 4 is a sensor spoof observer and controller method in accordance with some embodiments.

The system 300 of FIG. 3 may then implement a sensor spoof observer and controller method to protect the charging infrastructure. For example, FIG. 4 is a sensor spoof observer and controller method in accordance with some embodiments. At S410, a sensor spoof observer and controller may receive information from at least two AC current sensors. At S420, the sensor spoof observer and controller may calculate a grid voltage disturbance using a structure based on an AC filter dynamic model. At S430, the model may be continuously corrected using a difference between a measured output and an observed output to minimize state-variable divergence. At S440, the system may compare observer output and measurement output to determine if charging site is experiencing normal operation or a cyber-attack.

Figure 5:
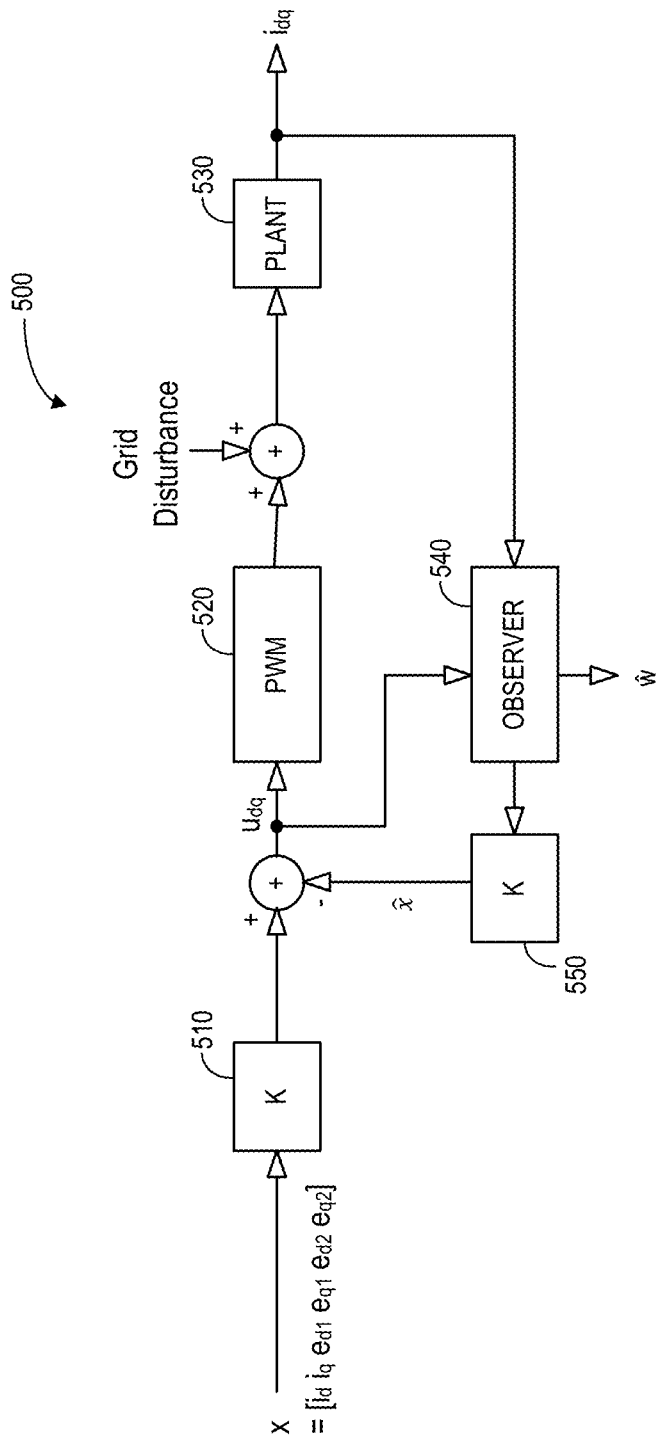
FIG. 5 illustrates a grid disturbance observer according to some embodiments.

To increase system fault tolerance, redundant current sensors may be leveraged on the AC side at different locations, such as current sensor 1 and current sensor 2 in the plant 350 of FIG. 3. When current sensor under use is cyber-attacked, the backup current sensor can be used by the controller. The AC-DC converter grid side may interface with the power grid through an AC filter. Consider, for example, FIG. 5 which illustrates 500 a grid disturbance observer 540 according to some embodiments. Charging site parameters $i_d$ (measured d axis current), $i_q$ (measured q axis current), $e_{d1}$ (measured line voltage first harmonic in d), $e_{q1}$ (measured line voltage first harmonic in q), $e_{d2}$ (measured line voltage second harmonic in d), and $e_{q2}$ (measured line voltage first harmonic in d) may be provided through a constant K 510 to an adding element. The output of the adding element may be coupled to a Pulse Width Modulation ("PWM") rectifier 520. Another adding element may combine the output of the PWM rectifier 520 with a grid disturbance signal w to create $i_{dq}$ after traveling through a plant 530. The signal $i_{dq}$ may be provided to the observer 540 which generates $\hat{w}$ and $\hat{x}$ (which is provide to the first adding element through the constant K 550. Note that in FIG. 5, $\hat{x}$ represents the estimated state variable that can be used for harmonic cancellation, and $\hat{w}$ is the estimated grid voltage disturbance.

In this way, the observer 540 may be created in the controller using the same structure as the AC filter dynamic model. The difference between the measured output and the observed output may be fed back to the observer 540 to continuously correct the model and minimize the state-variable divergence. The observer 540 can calculate the grid voltage disturbance, such as unbalance, from its state-variable value. The estimated positive and negative sequence can be extracted from the observer 540. According to some embodiments, the sensed three-phase voltage signals (primarily used for phase lock loop) may be decoupled into positive and negative sequences in a separate program.

Figure 6:
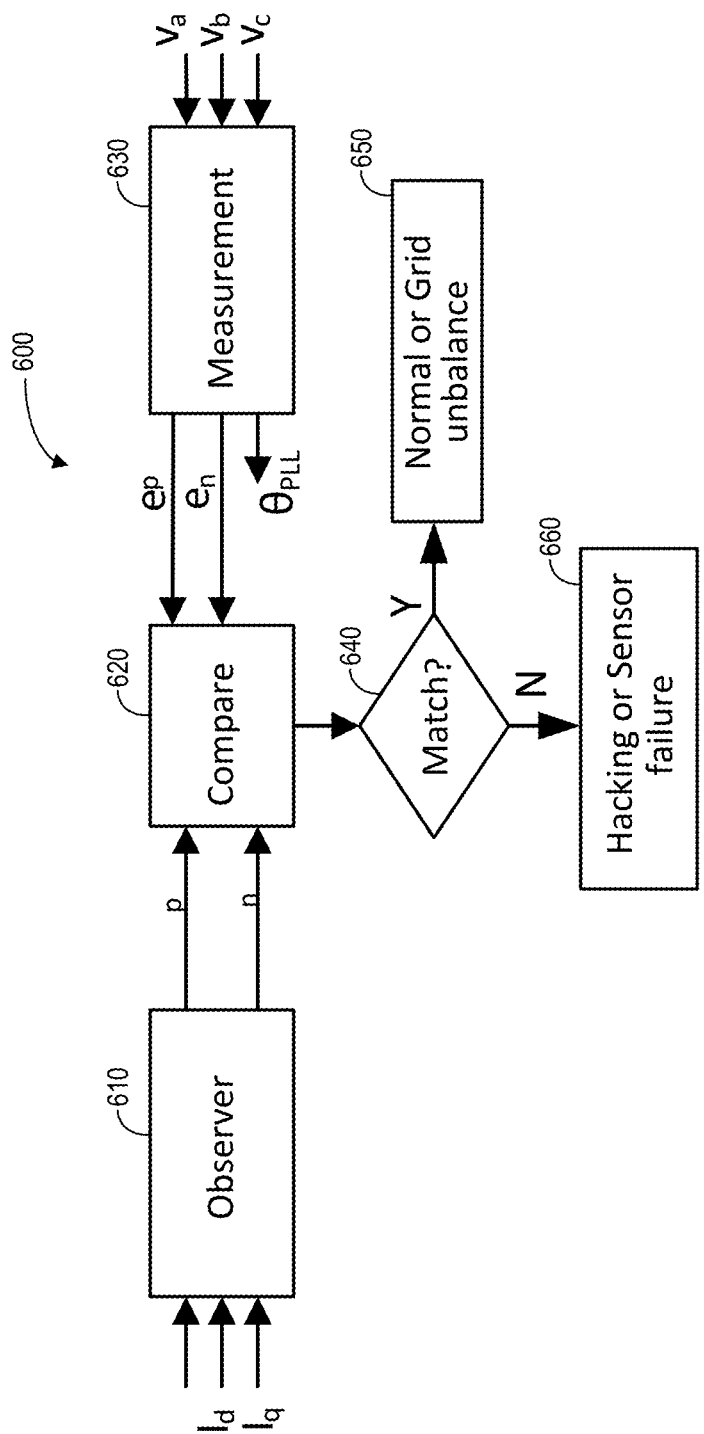
FIG. 6 illustrates a grid disturbance observer used to detect a cyber-attack in accordance with some embodiments.

FIG. 6 illustrates 600 a grid disturbance observer 610 that receives $i_d$ and $i_q$ to detect a cyber-attack in accordance with some embodiments. The outputs $\hat{e}_p$ and $\hat{e}_n$ (which comprise $\hat{w}$ in FIG. 5) from the observer may be compared 620 with measurement 630 values $e_p$ and $e_n$ representing positive and negative sequence of line voltage (based on line three-phase voltages $v_a$, $v_b$, and $v_c$). Note that the measurement 630 values may also include $\theta_{PLL}$ (line voltage Phase-Lock Loop ("PLL") angle, with voltage vector aligned at d axis). If the compare 620 results in a match 640, the charging site is probably operating normally 650 (or experiencing a grid unbalance). If the positive and negative voltage sequences from estimator and a measurement diverge beyond a certain limit, and thus do not result in a match 640, the disturbance is likely coming from a cyber-attack 660 (e.g., sensor hacking). Such an approach coordinates AC current and voltage signals making it difficult to cheat the controller with via hacking.

Figure 7:
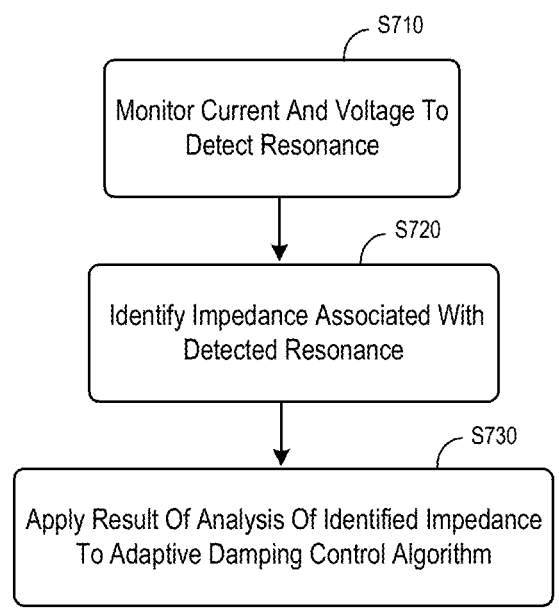
FIG. 7 is a system stability assurance method according to some embodiments.

In addition to providing a method to detect a spoofed sensor and a controller to maintain converter control stability with a spoofed sensor, some embodiments may provide a method to detect system resonance due to a cyber attack and to help damp such system resonance. For example, FIG. 7 is a system stability assurance method according to some embodiments. At S710, a system stability assurance platform may monitor current and voltage to detect resonance. At S720, the system stability assurance platform may identify impedance associated with a detected resonance and apply a result of an analysis of the identified impedance to an adaptive damping control algorithm at S730.

The system stability assurance algorithm might be developed, for example, based on an impedance-based stability analysis approach. At the charging station level, stability assurance algorithms may be focused on the shared DC bus to which the inverters, DC-to-DC chargers, and energy storage units are connected. At the substation level, the algorithms may be focused on the distribution network to which one or multiple charging stations are connected. Although they respectively address DC systems and AC systems, the two system-level stability assurance algorithms may nonetheless be similarly comprised of three elements: (1) resonance detection, (2) online system impedance identification, and (3) online control adaptation.

To detect resonance, the current and voltage at the Point of Common Connection ("PCC") may be monitored. Different signal processing methods, such as sliding DFT or wavelet analysis can be applied. The detection algorithm may, according to some embodiments, have a relatively fast response to the resonance and output an accurate estimation of the resonance frequency.

With respect to the online impedance identification and attack categorization, when resonance (or a cyber-attack from the IT and/or OT layer) is detected, the impedance of different converters or grids may be identified. To improve Signal-to-Noise Ratio ("SNR"), a small-signal injection method may be used to obtain accurate impedance information. Given the impedance information of the converters and grids, the compromised converter(s) can be identified by comparing the identified impedance responses with analytical model predictions. Based on the measured impedance and analytical models, the system control parameters, operating points, can be estimated through the numerical approximation of the transfer function. Next, estimated control parameters and operating points information may be compared with a nominal value to distinguish the abnormal operation (cyber-attack) as well as the different types of cyber-attack. For example, if resonance is detected while the impedance analysis shows a relatively large stability margin or that damping and estimated control parameters are close to a rated value, it could be concluded that a cycling setpoint attack is detected. The machine learning can also be used for attack detection and characterization. For example, according to some embodiments the impedance amplitude of the comprised converter control may show peaks or dips and such features can be leveraged as training features.

With respect to online control adaptation, the system stability margin may be found by comparing the impedances of the converters connected to the PCC. Further, with the help of the impedance analysis, adaptive damping control algorithm may be enabled in uncompromised converters to improve system stability. Narrow-band damping algorithms, such as virtual impedance and a Proportional-Resonance ("PR") regulator, may be implemented at the energy storage converters (e.g., a reservoir converter). The selection of different damping schemes and control parameters might be determined, according to some embodiments, by an adaptive damping control algorithm.

Figure 8:
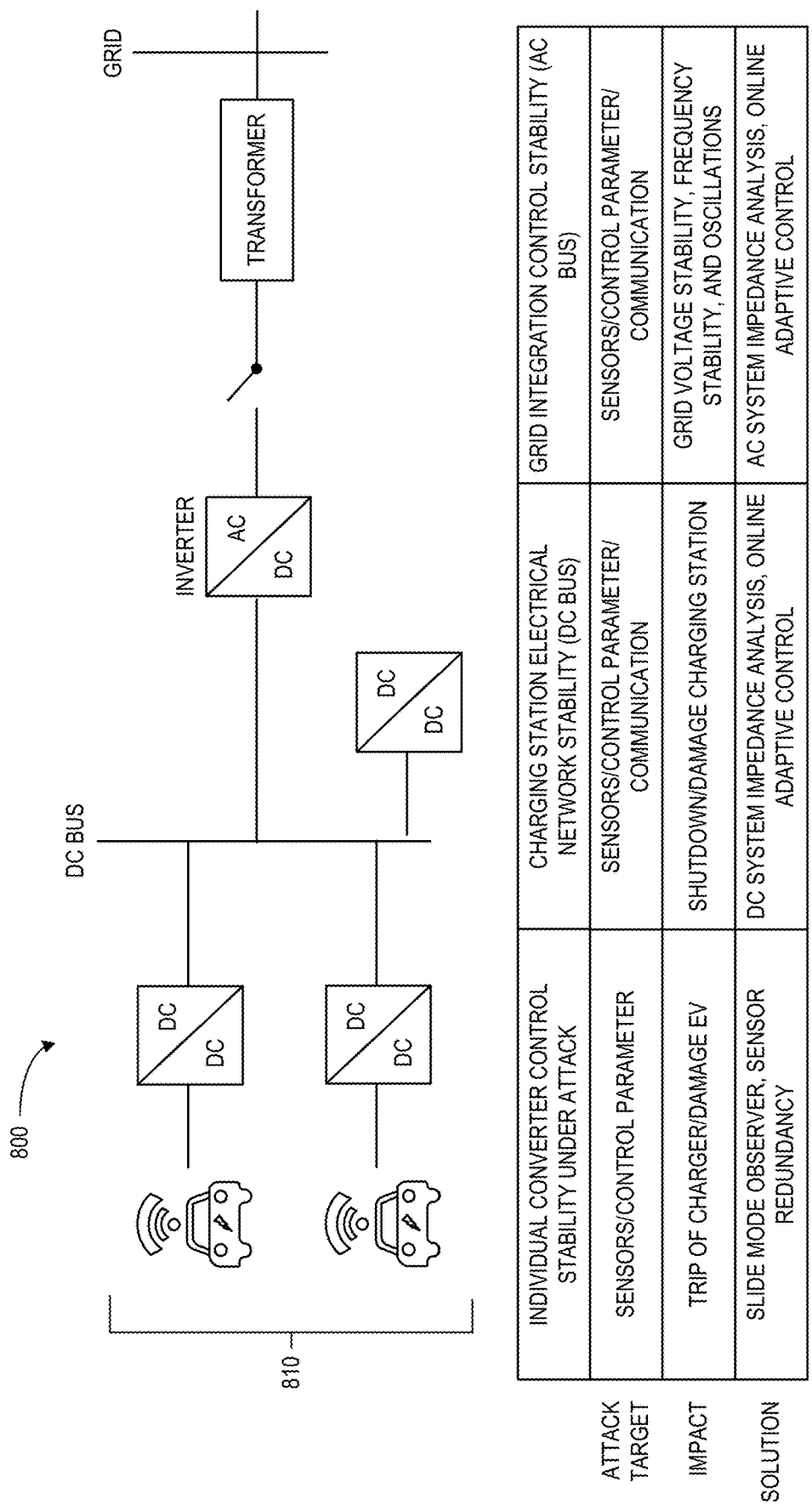
FIG. 8 is a system implemented as a hierarchy according to some embodiments.

According to some embodiments, the aforementioned system can be implemented in a hierarchy 800 as shown in FIG. 8. The top portion 810 shows that a charging station cyber-physical system can be decomposed into three levels from bottom to top: 1) an individual converter control layer, 2) a charging station layer, and 3) a substation layer. At different layers, different stability related cybersecurity algorithms (as mentioned before) might be used.

At the converter control layer, a robust observer algorithm, such as a sliding mode observer, may be developed to detect any compromised sensors and make appropriate decisions, including immediate shut-down or rectification of compromised feedback signals through a redundant current sensor. Such redundancy might be embedded in the converter so that control algorithms are tolerant to sensors compromised in a cyberattack.

At the charging station layer, a hacker may change the control parameters and/or setpoints of one or multiple EV chargers through communications protocols or through a firmware update (e.g., an Over The Air Upgrade ("OTAU")). According to some embodiments, impedance-based stability assurance and online adaptive control may be used for cyber-attack detection and neutralization. Stability assurance algorithms may focus more on the shared dc bus to which the inverters, and DC-DC chargers and energy storage units are connected.

At the substation layer, with the fast switching and control dynamics of the AC/DC converters, under-damped resonant modes of the grid network could be excited. In the sub-synchronous frequency range, the resonance could trigger overcurrent or overvoltage and stress the equipment. In the super-synchronous frequency range, high-frequency resonant current could pass through harmonic filters and cause overheating issues. Impedance based stability assurance algorithm may be used with a special focus on the distribution network connected to one or multiple charging stations. According to some embodiments, a sensor spoof observer and controller and the system stability assurance platform are implemented in a hierarchical manner such that the sensor spoof observer and controller is deployed in an individual converter control layer and the system stability assurance platform is deployed in a charging station layer and a substation layer.

Figure 9:
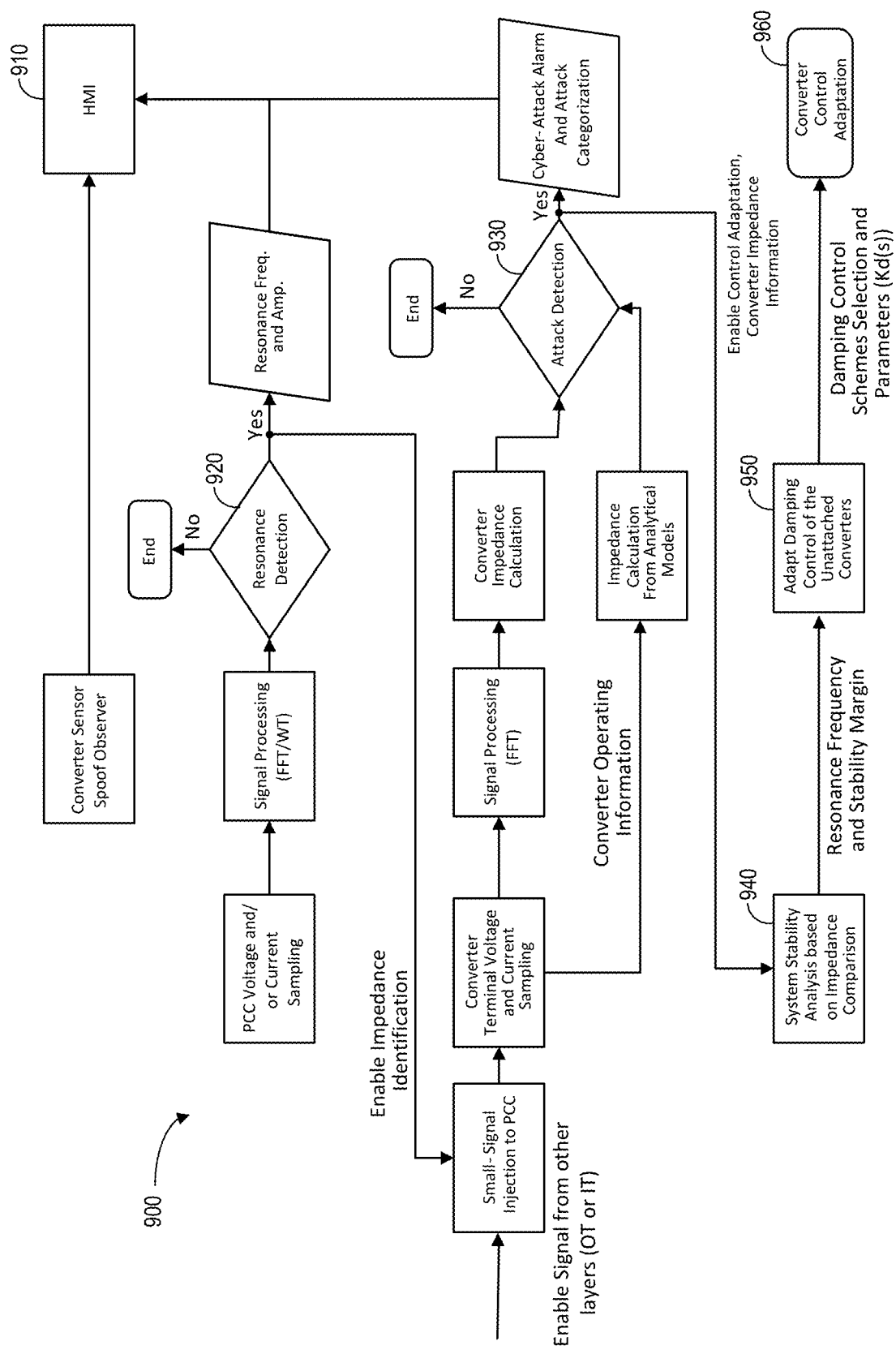
FIG. 9 is a system stability assurance information flow in accordance with some embodiments.

FIG. 9 is a system stability assurance information flow 900 in accordance with some embodiments. A Human Machine Interface ("HMI") display 910 may receive converter sensor and spoof sensor data to be provided to an operator (as described in connection with FIGS. 11 and 12). A resonance detection decision 920 may be made based on voltage and/or current sampling data after being processed by FFT and/or Wavelet transform ("WT") signal processing. If no resonance is detected at 920, this portion of the information flow 900 may end. If resonance is detected at 920, an alert including the resonance frequency and amplitude may be provided via the HMI 910.

Information about a detected resonance at 920 may also enable impedance identification by providing a small-signal injection to the PCC (e.g., to enable a signal from the OT or IT layer). Converter terminal voltage and current sampling may then be performed, signal processing (e.g., an FFT) may be executed, and converter impedance may be calculated so that an attack detection decision 930 may be made. According to some embodiments, the converter terminal voltage and current sampling may provide converter operating information to allow an impedance calculation via analytical models (and this information may also be used to make the attack detection decision at 930). If no attack is detected at 930, this part of the information flow 900 may end. If an attack is detected at 930, a cyber-attack alarm may be generated along with an attack categorization and the data may be provided via the HMI 910.

Information about a detected attack at 930 may also enable control adaptation using converter impedance information. In particular, the information may be used for a system stability analysis based on an impedance comparison at 904. The resonance frequency and stability margin may then be used to adapt damping control of unattached converters at 950. Damping control schemes may then be selected and appropriate parameters (Kd(s)) may be provided to a converter control adaptation process 960.

Figure 10:
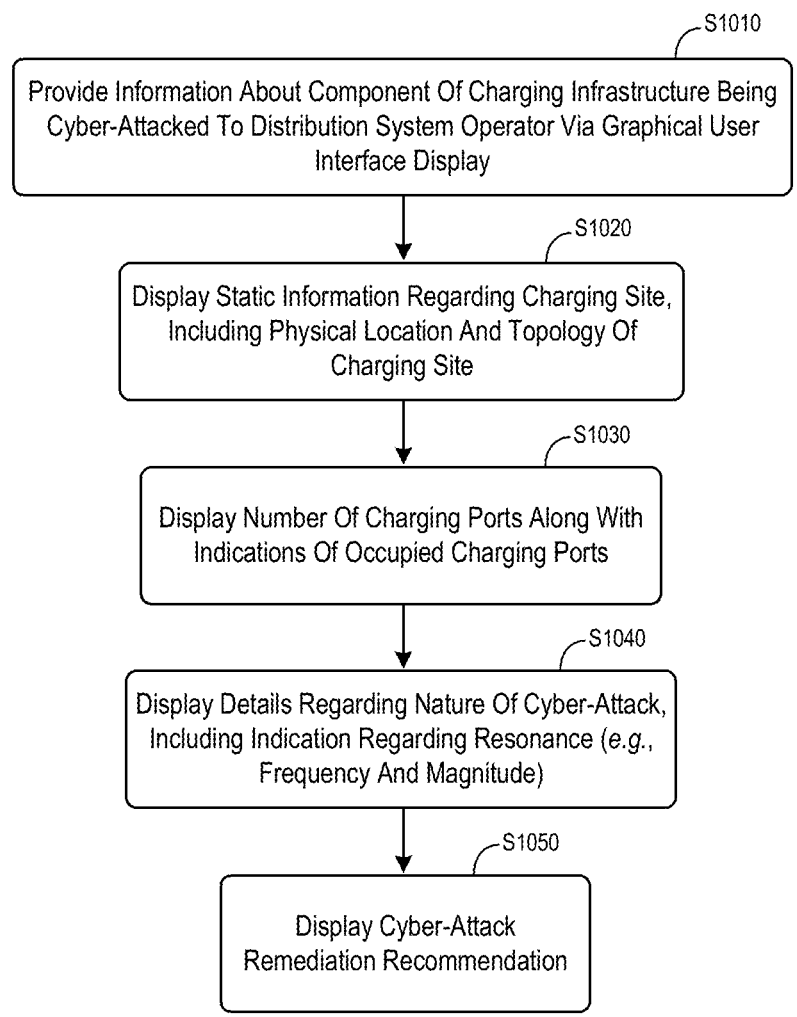
FIG. 10 is a human machine interface method according to some embodiments.

The HMI 910 may let an operator understand and respond to an ongoing cyber-attack. For example, FIG. 10 is an HMI method according to some embodiments. At S1010, a user interface platform may provide information about a component of a charging infrastructure being cyber-attacked to a distribution system operator via a graphical user interface display. For example, at S1020 static information regarding the charging site, such as a physical location of the charging site and/or a topology of the charging site, may be provided via the display. At S1030, a number of charging ports and/or indications of occupied charging ports (that is, occupied by an EV) may be provided via the display. The display might also provide details about a current cyber-attack. For example, at S1040 the display may provide an indication regarding resonance and/or a frequency or magnitude of resonance. At S1050, one or more automatically determined cyber-attack remediation recommendations may be provided to the operator (e.g., steps he or she might take to reduce the harm being caused by the cyber-attack).

Figure 11:
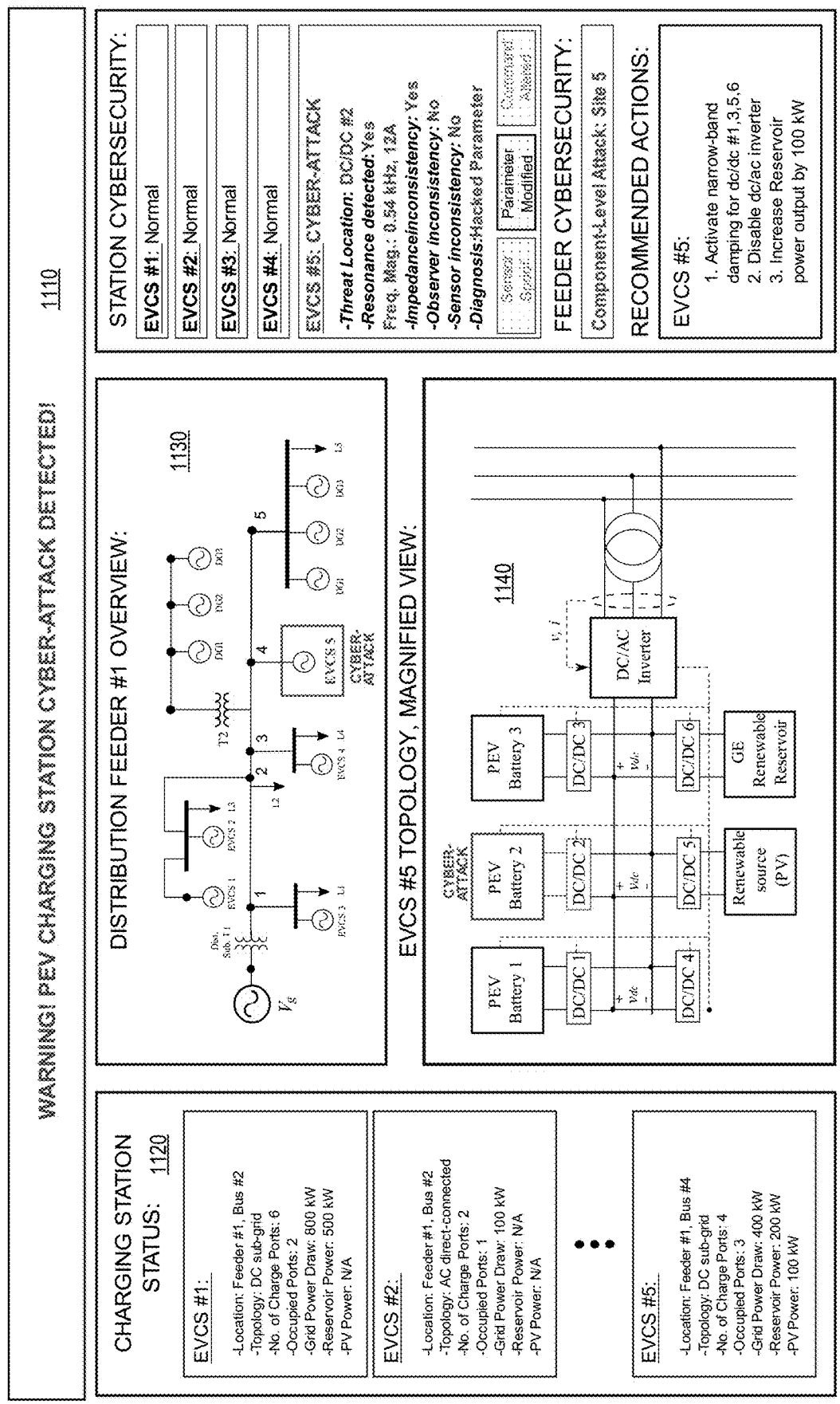
FIGS. 11 and 12 are graphical user interface displays in accordance with some embodiments.

In this way, elements of the HMI display may help an operator respond to a cyber-attack. For example, FIG. 11 is a graphical user interface display 1100 that might be available to a distribution system operator according to some embodiments. The display 1100 includes a warning alert area 1110, charging station status 1120, a distribution feeder overview 1130, an EV charging station topology overview 1140, and station cyber security information. According to some embodiments, the display 1100 is interactive and may be used by an operator to determine more detailed information (e.g., via selection of an icon via a touchscreen or computer mouse pointer) and/or to adjust the operation of the system.

The display 1100 provides relevant information concerning the PEV charging stations within the distribution system and alerts the operator when a cyberattack has targeted one or more of the charging stations. For each charging station, the display 1100 may provide static information regarding that station, such as the physical location of that station within the distribution system; topology of the station (e.g., the chargers are connected to a DC sub-grid, or directly interfaced to the AC grid); and/or the number of charging ports. The display 1100 may also provide live updates regarding the number of occupied charging ports, the power drawn by each charging station, power drawn or absorbed by a battery energy storage source (such as a renewable energy reservoir) that may be located at the charging station, and/or the power produced by a local renewable resource, if applicable. The display 1100 may also show a pictorial representation of the distribution system feeder(s) and can include a magnified representation of any of the charging stations located within the feeder. During a cyberattack, the station identified as undergoing a cyber-attack may be highlighted (e.g., by being displayed using a different color) and attacked components of that station may be identified in the magnified representation. Additionally, relevant details regarding the nature of the cyberattack may be listed, including the charging station components (e.g., a DC-DC converter) involved in the attack; an indication regarding the presence of a resonance in the DC bus current or voltage measurements of the attacked station; and/or a frequency and magnitude of DC bus resonance, if applicable. The display 1100 may also provide an indication about any inconsistency between the measured impedance and the impedance of the DC/DC converters and/or DC bus obtained using analytical models; the existence of an inconsistency between a measured disturbance (such as a voltage sag) and the disturbance information obtained using the observer algorithm; and/or the existence of an inconsistency in redundant sensor measurements. Finally, recommendations are provided on the display 1100 to assist help an operator mitigate the impact of a cyber-attack and to provide for satisfactory station operation even during an ongoing attack.

Figure 12:
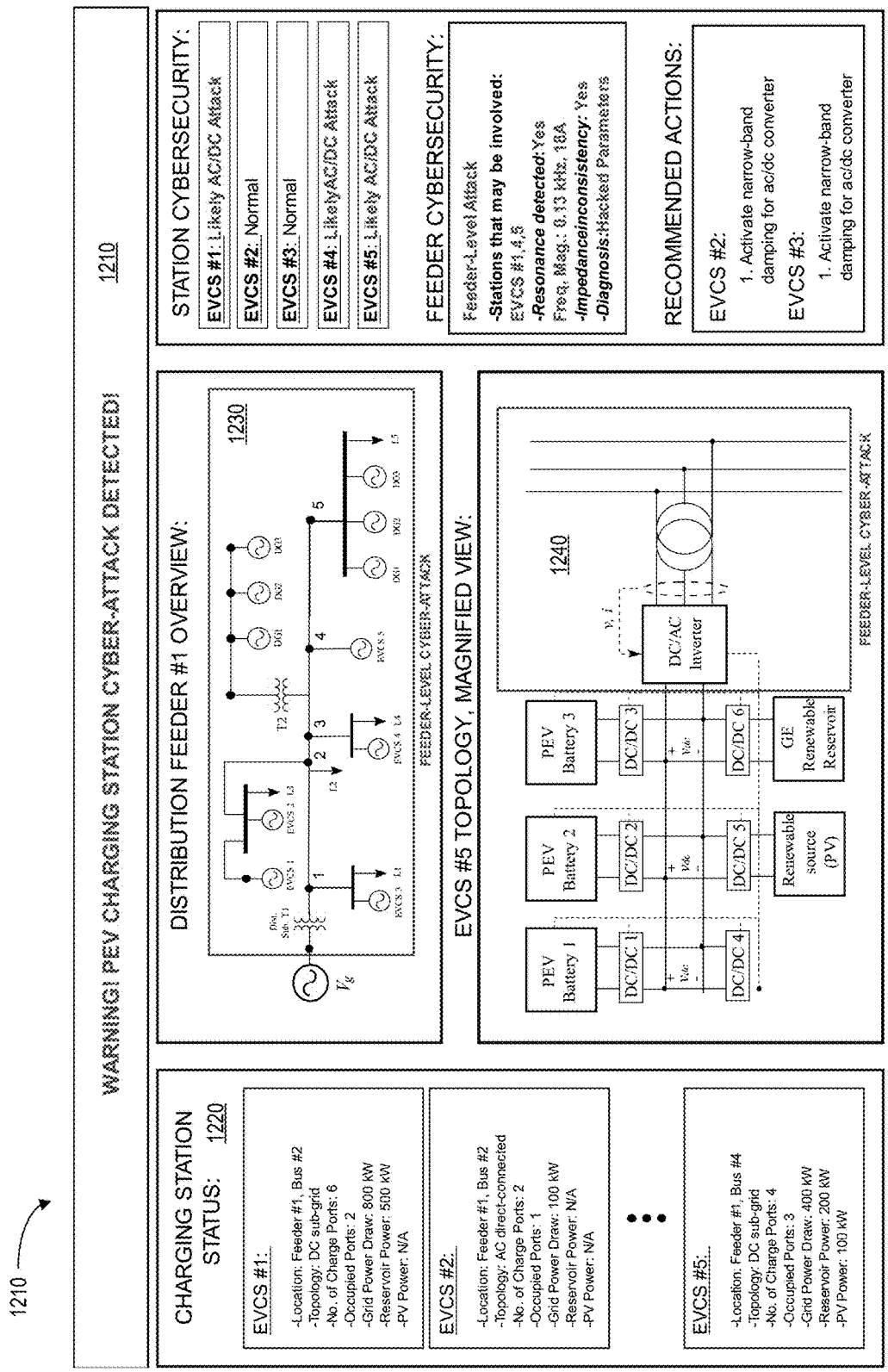

FIG. 12 is a display 1200 that might be shown to a distribution system operator when algorithms detect a substation-level stability threat associated with a cyber-attack on one or more PEV charging station sites. As before, the display 1200 includes a warning alert area 1210, charging station status 1220, a distribution feeder overview 1230, an EV charging station topology overview 1240, and station cyber security information. Note that only subtle changes in AC/DC converter parameters may be required to launch an attack that has significant impact upon the feeder operation. To the extent that hardware is installed in the feeder for signal injection and voltage and current measurement, a stability assurance algorithm might determine the impedance of each AC/DC converter, compare it with analytical models, and use this impedance information to determine whether that AC/DC converter is playing a role in the substation-level attack. The display 1200 may highlight the AC/DC converters that are playing a role in the attack, as well as the frequency and magnitude of any identified voltage or current resonance detected in measurements from the sensors in the feeder. Finally, the display 1200 may provide one or more recommendations to assist the operator in countering the substation-level attack—such as recommendations regarding proposed control modifications to uncompromised AC/DC converters that may help to dampen resonance.

Figure 13:
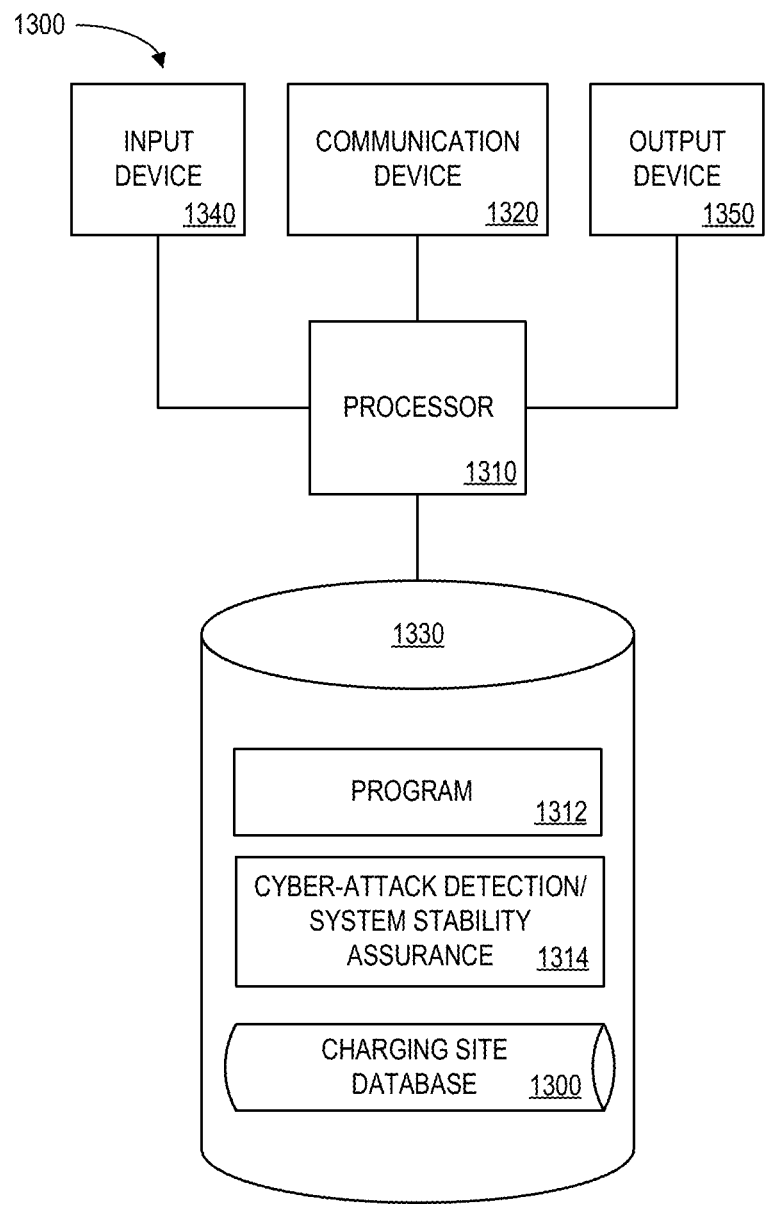
FIG. 13 is a block diagram of an electric vehicle charging infrastructure protection platform according to some embodiments of the present invention.

The embodiments described herein may be implemented using any number of different hardware configurations. For example, FIG. 13 is a block diagram of an electric vehicle charging infrastructure protection platform 1300 that may be associated with the system 100 of FIG. 1. The electric vehicle charging infrastructure protection platform 1300 comprises a processor 1310, such as one or more commercially available Central Processing Units ("CPUs") in the form of one-chip microprocessors, coupled to a communication device 1360 configured to communicate via a communication network (not shown in FIG. 13). The communication device 1360 may be used to communicate, for example, with one or more remote monitoring nodes, EVs, digital twins, etc. The electric vehicle charging infrastructure protection platform 1300 further includes an input device 1340 (e.g., a computer mouse and/or keyboard to input adaptive and/or predictive modeling information regarding cybersecurity) and/or an output device 1350 (e.g., a computer monitor to render a display, provide alerts, transmit recommendations, and/or create reports). According to some embodiments, a mobile device, monitoring physical system, and/or PC may be used to exchange information with the electric vehicle charging infrastructure protection platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or modules 1314 (e.g., associated with cyber-attack detection and/or system stability assurance) for controlling the processor 1310. The processor 1310 performs instructions of the programs and modules 1312, 1314, and thereby operates in accordance with any of the embodiments described herein. For example, the processor 1310 may receive information from at least two AC current sensors, (and an observer may calculate a grid voltage disturbance using a structure based on an AC filter dynamic model). The processor 1310 may then monitor current and voltage to detect resonance, identify impedance associated with a detected resonance, and apply a result of an analysis of the identified impedance to an adaptive damping control algorithm. The processor 1310 may then arrange to provide information about a component of the charging infrastructure being cyber-attacked to a distribution system operator via a Graphical User Interface ("GUI") display.

The programs 1313, 1314 may be stored in a compressed, uncompiled and/or encrypted format. The programs 1313, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the electric vehicle charging infrastructure protection platform 1300 from another device; or (ii) a software application or module within the electric vehicle charging infrastructure protection platform 1300 from another software application, module, or any other source.

In some embodiments (such as the one shown in FIG. 13), the storage device 1330 further stores a charging site database 1400. An example of a database that may be used in connection with the electric vehicle charging infrastructure protection platform 1300 will now be described in detail with respect to FIG. 14. Note that the database described herein is only one example, and additional and/or different information may be stored therein. Moreover, various databases might be split or combined in accordance with any of the embodiments described herein.

Figure 14:
FIG. 14 is a tabular portion of a charging site database in accordance with some embodiments.

Referring to FIG. 14, a table is shown that represents the charging site database 1400 that may be stored at the electric vehicle charging infrastructure protection platform 1200 according to some embodiments. The table may include, for example, entries identifying electric vehicle charging infrastructure components to be protected. The table may also define fields 1402, 1404, 1406, 1408, 1410 for each of the entries. The fields 1402, 1404, 1406, 1408, 1410 may, according to some embodiments, specify: charging station identifier 1402, an electric vehicle charging component description 1404, spoofed sensor detection information 1406, system resonance information 1408, and HMI display data 1410. The charging site database 1400 may be created and updated, for example, when a new charging site or pump added to be monitored or modeled, new data is received from charging site components, etc.

The charging station identifier 1402 and description 1404 may define a particular machine or system that will be protected from (or will be used to protect against) cyber-attacks. The spoofed sensor detection information 1406 may indicate that the particular portion of the system is currently "normal" or under "cyber-attack." The system resonance information 1408 might indicate that no resonance is detected (e.g., operation is normal), that resonance is detected (e.g., along with a frequency and/or magnitude of the resonance), that resonance has been successfully dampened, etc. The HMI display data 1410 may indicate information that is being provided to an operator (including, according to some embodiments, any recommended actions that are being suggested as a result of a detected cyber-attack).

A flexible, software-based test environment might be implemented (e.g., in a MATLAB programming platform) to facilitate the development and/or evaluation of candidate intrusion detection algorithms. Within such an environment, a first-principles, physics-based model of a 2-area, 11-bus power system might be used to generate realistic time-dependent trajectories of system states in response to dynamic events. Using this model, the test environment may be capable of automatically simulating a large number of transient events, including both actual fault events and spoofed data injections from compromised PMU(s) that resemble fault events. For example, a cyber-attack might involve a hacker spoofing a PMU signal by replaying historical fault data in an attempt to illicit a response from the control system that disrupts grid operations.

Figure 15:
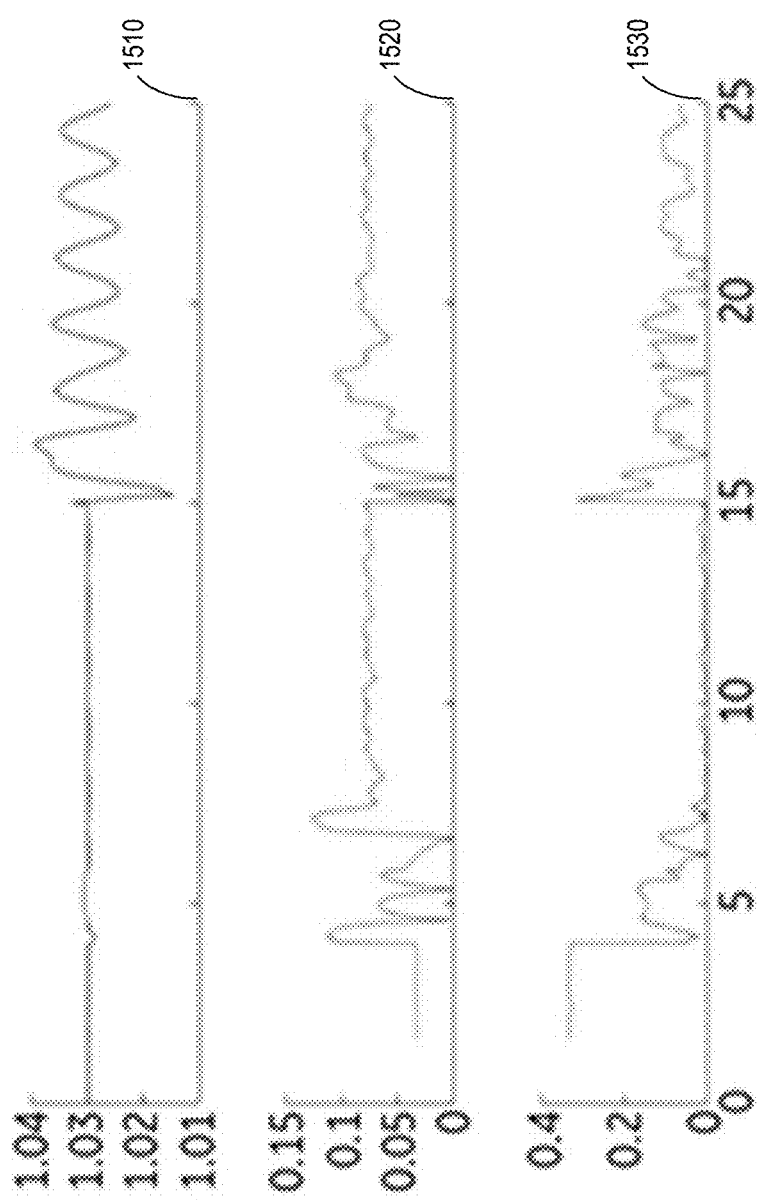
FIG. 15 illustrates an original voltage magnitude signal and time evolution of a first element of right singular vectors according to some embodiment.

FIG. 15 illustrates an original voltage magnitude signal 1510 and time evolution of a first element of right singular vectors, for the two lowest dimensional subspaces 1520, 1530, after Principal Component Analysis ("PCA") is performed according to some embodiment. Note that a fault is simulated at time 15 seconds ("s"), and FIG. 15 shows an example of how the fault impacts the two lowest-dimension right singular vectors of the PMU moving window data in a similar manner.

Thus, some embodiments may provide an online system stability assurance framework. The framework may: (1) predict system instability when an individual converter control assurance algorithm is enabled due to a physical layer attack; (2) predict system instability when system control parameters or setting points are altered through cyberattack; and/or (3) adapt control algorithms to ensure electrical system stability when unstable modes are identified. Successful threat mitigation and enhanced grid stability in the face of EVSE cyberattacks may save substantial resources by avoiding damage to critical power grid infrastructure components. Other benefits may include a reduction in traffic accidents that might otherwise result from cyber-attacks.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 16:
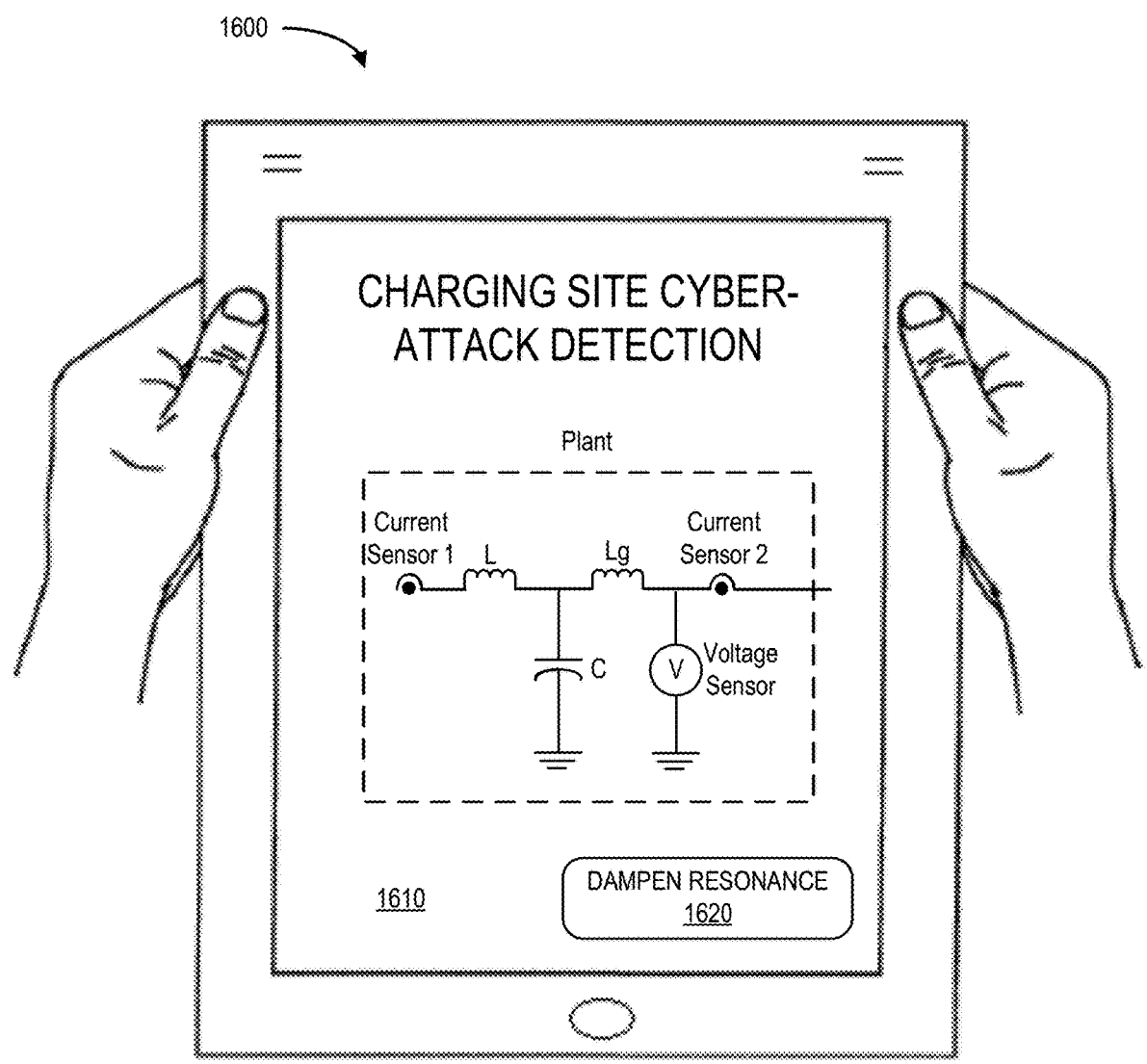
FIG. 16 is a tablet computer in accordance with some embodiments.

Although specific hardware and data configurations have been described herein, note that any number of other configurations may be provided in accordance with embodiments of the present invention (e.g., some of the information associated with the databases described herein may be combined or stored in external systems). Moreover, the display described here are merely exemplary and other types of displays and display devices might be used instead. For example, FIG. 16 illustrates a tablet computer 1600 providing an electric vehicle charging infrastructure cyber-attack display 1610 in accordance with any of the embodiments described herein. Selection of a portion of the display 1610 (e.g., via touchscreen) might result in a display of additional information about an element of the display, adjust operation of the charging station (e.g., by activating a "Dampen Resonance" icon 1620), etc.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect an electric vehicle charging infrastructure, comprising:
an electric vehicle charging site to receive Alternating Current ("AC") power from a power grid and provides Direct Current ("DC") power to electric vehicles, including:
a sensor spoof observer and controller to receive information from at least two AC current sensors, wherein the observer calculates a grid voltage disturbance using a structure based on an AC filter dynamic model;
a system stability assurance platform to: (i) monitor current and voltage to detect resonance, (ii) identify impedance associated with a detected resonance, and (iii) apply a result of an analysis of the identified impedance to an adaptive damping control algorithm; and
a user interface platform to provide information about a component of the charging infrastructure being cyber-attacked to a distribution system operator via a graphical user interface display.

2. The system of claim 1, wherein the sensor spoof observer and controller and the system stability assurance platform are implemented in a hierarchical manner such that the sensor spoof observer and controller is deployed in an individual converter control layer and the system stability assurance platform is deployed in a charging station layer and a substation layer.

3. The system of claim 1, wherein the sensor spoof observer and controller utilizes information from a second AC current sensor when it is determined that a first AC current sensor is being cyber-attacked.

4. The system of claim 1, wherein the AC filter dynamic model is continuously corrected using a difference between a measured output and an observed output to minimize state-variable divergence.

5. The system of claim 1, wherein the grid voltage disturbance is associated with AC unbalance.

6. The system of claim 1, wherein the system stability assurance platform detects resonance associated with at least one of: (i) altered control parameters, and (ii) cycling setpoints.

7. The system of claim 1, wherein the system stability assurance platform includes an AC system-level stability assurance algorithm and a DC system-level stability assurance algorithm.

8. The system of claim 1, wherein the resonance is detected via at least one of: (i) a sliding Discrete Fourier Transform ("DFT"), and (ii) a wavelet analysis.

9. The system of claim 1, wherein the impedance associated with the detected resonance is identified using analytical model predictions and a small-signal injection to improve signal-to-noise ratio.

10. The system of claim 1, wherein the graphical user interface display includes at least one of: (i) static information regarding the charging site, (ii) a physical location of the charging site, (iii) a topology of the charging site, (iv) a number of charging ports, (v) indications of occupied charging ports, (vi) details regarding a nature of a cyber-attack, (vii) an indication regarding resonance, (viii) a frequency or magnitude of resonance, and (ix) a cyber-attack remediation recommendation.

11. The system of claim 1, wherein the electric vehicle charging site is associated with extreme fast charging.

12. A computerized method to protect an electric vehicle charging infrastructure that receives Alternating Current ("AC") power from a power grid and provides Direct Current ("DC") power to electric vehicles, comprising:
receiving, at a sensor spoof observer and controller, information from at least two AC current sensors;
calculating, by the sensor spoof observer and controller, a grid voltage disturbance using a structure based on an AC filter dynamic model;
monitoring, by a system stability assurance platform, current and voltage to detect resonance;
identifying, by the system stability assurance platform, impedance associated with a detected resonance;
applying, by the system stability assurance platform, a result of an analysis of the identified impedance to an adaptive damping control algorithm; and
providing, by a user interface platform, information about a component of the charging infrastructure being cyber-attacked to a distribution system operator via a graphical user interface display.

13. The method of claim 12, wherein the sensor spoof observer and controller utilizes information from a second AC current sensor when it is determined that a first AC current sensor is being cyber-attacked.

14. The method of claim 12, wherein the AC filter dynamic model is continuously corrected using a difference between a measured output and an observed output to minimize state-variable divergence.

15. The method of claim 12, wherein the grid voltage disturbance is associated with AC unbalance.

16. The method of claim 12, wherein the system stability assurance platform detects resonance associated with at least one of: (i) altered control parameters, and (ii) cycling setpoints.

17. The method of claim 12, wherein the system stability assurance platform includes an AC system-level stability assurance algorithm and a DC system-level stability assurance algorithm.

18. A non-transitory, computer-readable medium storing program code, the program code executable by a computer processor to cause the processor to perform a method to protect an electric vehicle charging infrastructure that receives Alternating Current ("AC") power from a power grid and provides Direct Current ("DC") power to electric vehicles, the method comprising:
   receiving, at a sensor spoof observer and controller, information from at least two AC current sensors;
   calculating, by the sensor spoof observer and controller, a grid voltage disturbance using a structure based on an AC filter dynamic model;
   monitoring, by a system stability assurance platform, current and voltage to detect resonance;
   identifying, by the system stability assurance platform, impedance associated with a detected resonance;
   applying, by the system stability assurance platform, a result of an analysis of the identified impedance to an adaptive damping control algorithm; and
   providing, by a user interface platform, information about a component of the charging infrastructure being cyber-attacked to a distribution system operator via a graphical user interface display.

19. The medium of claim 18, wherein the resonance is detected via at least one of: (i) a sliding Discrete Fourier Transform ("DFT"), and (ii) a wavelet analysis.

20. The medium of claim 18, wherein the impedance associated with the detected resonance is identified using analytical model predictions and a small-signal injection to improve signal-to-noise ratio.

21. The medium of claim 18, wherein the graphical user interface display includes at least one of: (i) static information regarding the charging site, (ii) a physical location of the charging site, (iii) a topology of the charging site, (iv) a number of charging ports, (v) indications of occupied charging ports, (vi) details regarding a nature of a cyber-attack, (vii) an indication regarding resonance, (viii) a frequency or magnitude of resonance, and (ix) a cyber-attack remediation recommendation.

22. The medium of claim 18, wherein the electric vehicle charging site is associated with extreme fast charging.

* * * * *